(12) United States Patent
Felder et al.

(10) Patent No.: US 8,106,892 B2
(45) Date of Patent: Jan. 31, 2012

(54) TOUCH SCREEN DRIVER FOR RESOLVING PLURAL CONTEMPORANEOUS TOUCHES AND METHODS FOR USE THEREWITH

(75) Inventors: Matthew D. Felder, Austin, TX (US); Marcus W. May, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 1128 days.

(21) Appl. No.: 11/927,289

(22) Filed: Oct. 29, 2007

(65) Prior Publication Data
US 2009/0109191 A1 Apr. 30, 2009

(51) Int. Cl.
*G06F 3/045* (2006.01)
(52) U.S. Cl. ............... 345/174
(58) Field of Classification Search .......... 345/173–174; 178/18.05
See application file for complete search history.

(56) References Cited

U.S. PATENT DOCUMENTS

| | | |
|---|---|---|
| 5,933,102 A | 8/1999 | Miller et al. |
| 6,738,048 B1 | 5/2004 | Rundel |
| 7,411,581 B2 | 8/2008 | Hardie-Bick |
| 2002/0185981 A1* | 12/2002 | Dietz et al. ............... 315/169.3 |
| 2003/0076307 A1* | 4/2003 | Krajewski et al. ............ 345/174 |
| 2004/0263489 A1* | 12/2004 | Wallenius ................... 345/173 |
| 2006/0009799 A1 | 1/2006 | Kleshinski et al. |
| 2007/0236478 A1 | 10/2007 | Geaghan et al. |

FOREIGN PATENT DOCUMENTS

| | | |
|---|---|---|
| JP | 2007-018086 A | 1/2007 |
| KR | 10-2004-0042150 A | 5/2004 |

OTHER PUBLICATIONS

Machine translation of Korean publication # KR10-2004-0042150.*
Machine translation of Japanese publication # JP2007-018086.*
International Search Report and Written Opinion correlating to PCT/US2008/078090 dated May 20, 2009.

* cited by examiner

*Primary Examiner* — Sumati Lefkowitz
*Assistant Examiner* — Robert E Carter, III

(57) ABSTRACT

A touch screen driver that can be used with a resistive touch screen includes an input/output module that supplies at least one input signal to at least one of a plurality of input/output ports of the touch screen and that generates at least one output signal, in response to the at least one input signal, and in accordance with at least one control signal. A controller module generates the at least one control signal and that generates a position signal representing a resolved position in accordance with a plurality of contemporaneous touches of the resistive touch screen.

16 Claims, 11 Drawing Sheets

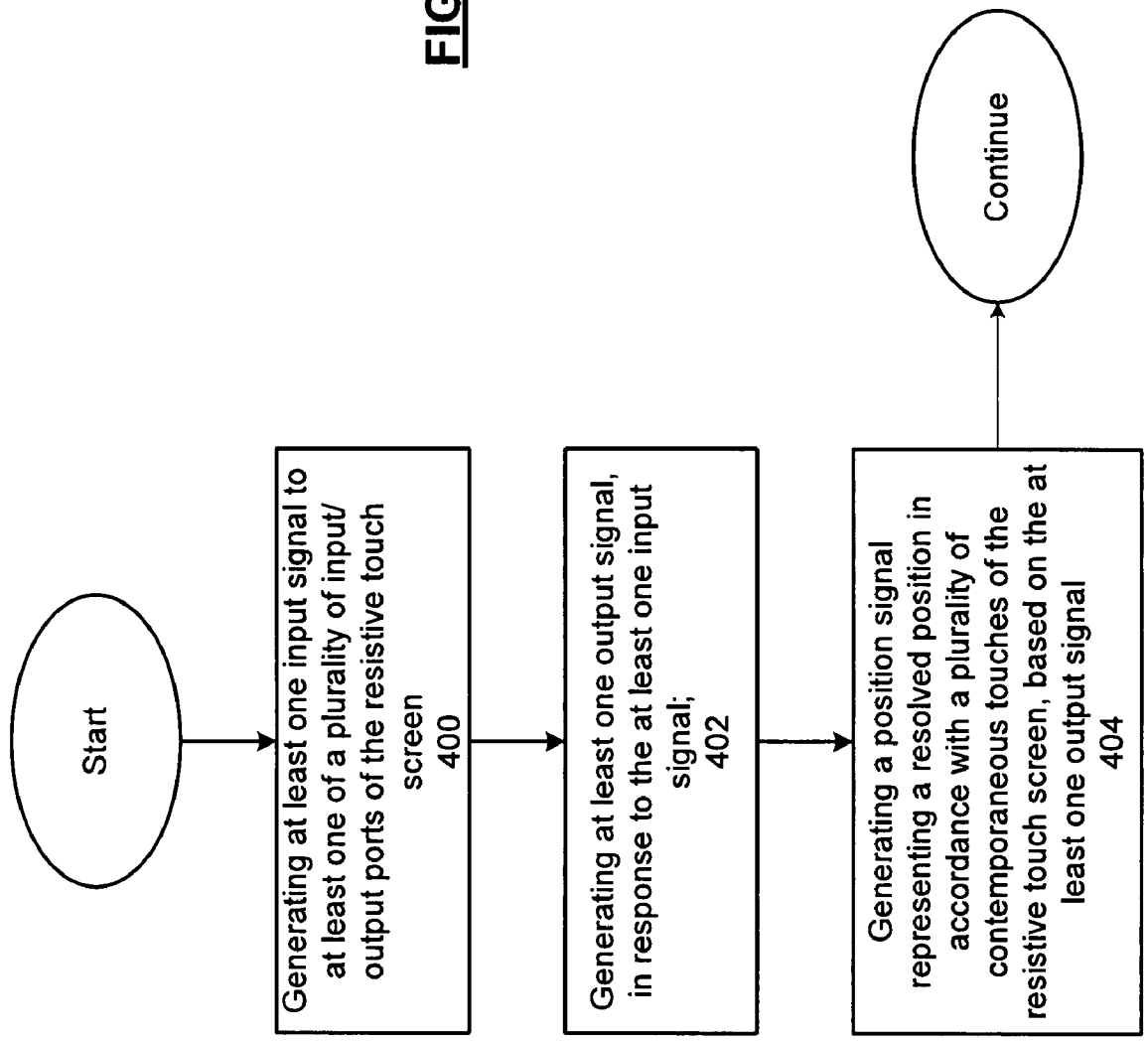

TOUCH SCREEN DRIVER FOR RESOLVING PLURAL CONTEMPORANEOUS TOUCHES AND METHODS FOR USE THEREWITH

CROSS REFERENCE TO RELATED PATENTS

None

TECHNICAL FIELD OF THE INVENTION

The present invention relates to touch screen drivers, touch screens and related methods used in devices such as handheld devices.

DESCRIPTION OF RELATED ART

Display screens capable of touch input or touch screens, are used in a wide variety of electronic equipment including portable, or handheld, devices. Such handheld devices include personal digital assistants (PDA), CD players, MP3 players, DVD players, AM/FM radios, pagers, and cellular telephones, etc. Each of these handheld devices includes one or more integrated circuits to provide the functionality of the device.

Certain touch screens, such as resistive touch screens are designed only for resolving the position of a single touch. While capacitive touch screens can be modified to resolve certain position information for multiple touches, the drivers for these touch screens are more complex and these touch screens can be more costly to implement.

The need exists for touch screen drivers that can be implemented efficiently on an integrated circuit, and that can resolve the position of multiple touches of a touch screen.

BRIEF DESCRIPTION OF THE SEVERAL VIEWS OF THE DRAWINGS

FIG. 14 presents a flowchart representation of a method in accordance with an embodiment of the present invention.

DETAILED DESCRIPTION OF THE INVENTION INCLUDING THE PRESENTLY PREFERRED EMBODIMENTS

The embodiments of the present invention yield several advantages over the prior art. A resistive touch screen driver can resolve the center, distance between and/or the position of multiple touches of the touch screen and can be easily implemented in, for instance, an integrated circuit. In a further embodiment, the touch screen driver can resolve multiple touches based on temporal differences and be applied to resistive or capacitive touch screens.

Figure 1:
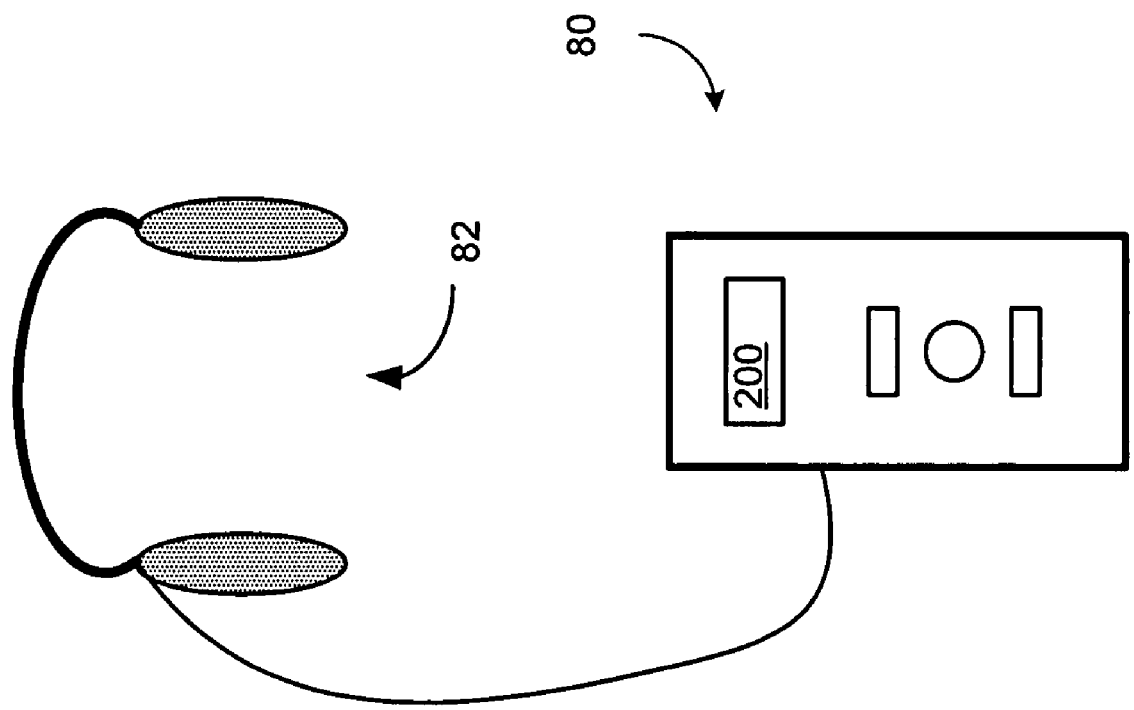
FIG. 1 presents a pictorial diagram representation of a handheld audio system in accordance with an embodiment of the present invention.

FIG. 1 presents a pictorial diagram of a handheld audio system in accordance with an embodiment of the present invention. In particular, a handheld audio system 80 is shown that receives a radio signal. In an embodiment of the present invention, the radio signal includes one or more of a broadcast frequency modulated (FM) radio signal, an in-band on-channel (IBOC) digital radio signal, a Bluetooth signal, a broadcast amplitude modulated (AM) radio signal, a broadcast satellite radio signal, and a broadcast cable signal.

In operation, the handheld audio system 80 produces an audio output for a user by means of headphones 82 or other speaker systems. In addition to producing an audio output from the received radio signal, the handheld audio system 80 can optionally process stored MP3 files, stored WMA files, and/or other stored digital audio files to produce an audio output for the user. The handheld audio system 80 may also include video features as well. Handheld audio system 80 includes a touch screen 200 for providing a user interface for controlling the device. Handheld audio system 80 further includes a touch screen driver 275 and/or one or more integrated circuits (ICs) that implement the features and functions in accordance with one or more embodiments of the present invention that are discussed herein.

Figure 2:
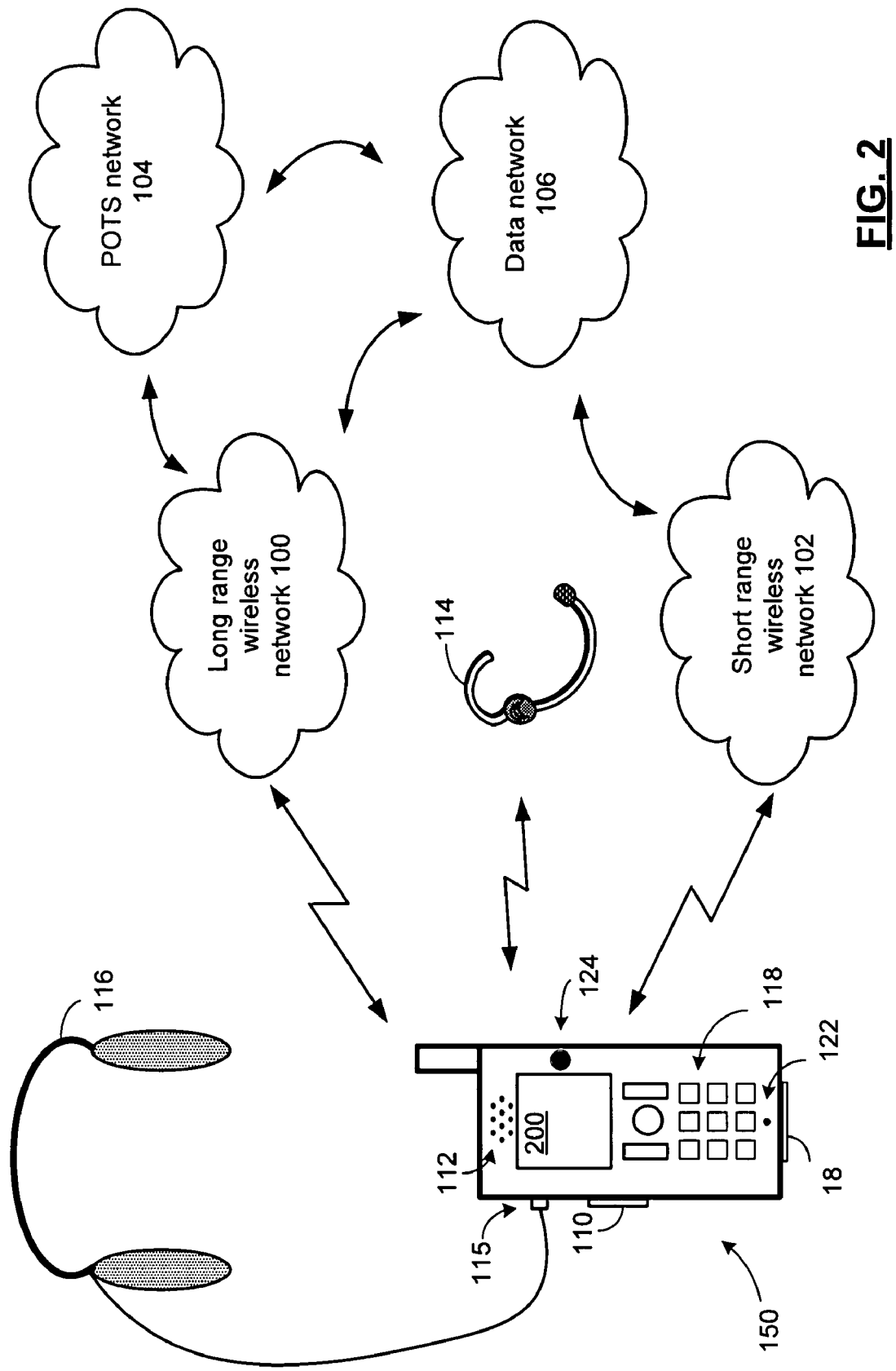
FIG. 2 presents a pictorial diagram representation of a multifunction portable device in accordance with an embodiment of the present invention.

FIG. 2 presents a pictorial diagram representation of a multifunction portable device in accordance with an embodiment of the present invention. In particular, a multifunction portable device 150 communicates over a long range wireless network 100 that is operably coupled to the plain old telephone service (POTS) network 104 and data network 106. Multifunction portable device 150 can further communicate over short range wireless network 102 to data network 106. In an embodiment of the present invention, long range network 100 includes a wireless telephone network such as cellular, personal communications service (PCS), general packet radio service (GPRS), global system for mobile communications (GSM), and integrated digital enhanced network (iDEN) or other wireless communications network capable of sending and receiving telephone calls. Further, data network 106 includes the Internet and short range wireless network 102 includes an access point that communicates with the multifunction portable device 150 via a radio frequency communications link such as 802.11x, Wimax, a wireless local area network connection of other communications link. In this fashion, multifunction portable device 150 can place and receive telephone calls, text messages such as emails, short message service (SMS) messages, pages and other data messages that may include multimedia attachments such as documents, audio files, video files, images and other graphics.

Multifunction portable device 150 optionally includes a camera 124 for capturing still and/or video images, removable memory card 100 for providing additional memory and removable storage, and host interface 18 for uploading and downloading information directly to a host device such as a computer.

Figure 4:
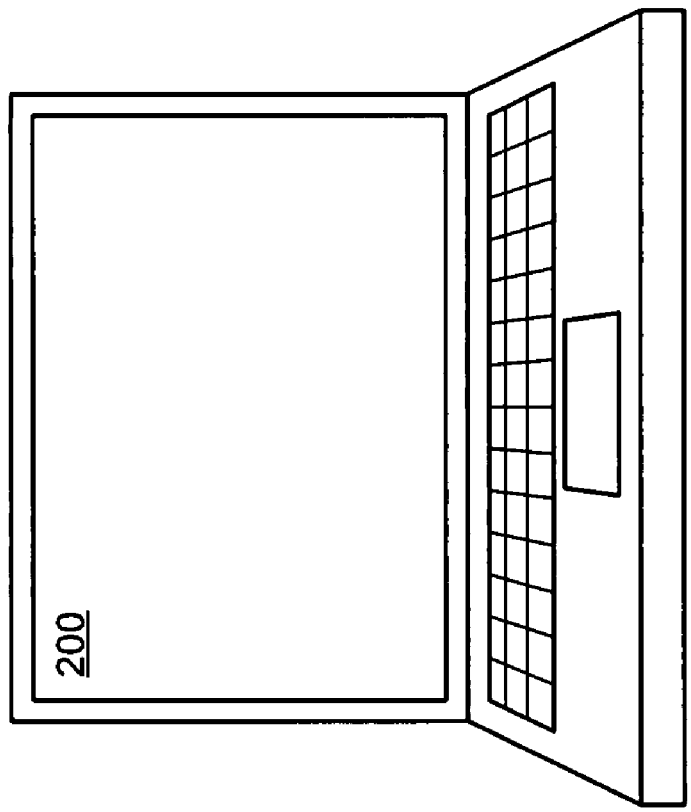
FIG. 4 presents a pictorial diagram representation of a computer in accordance with an embodiment of the present invention.
Figure 3:
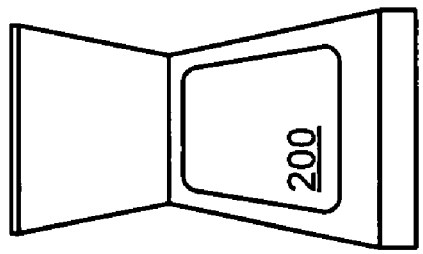
FIG. 3 presents a pictorial diagram representation of a personal digital assistant in accordance with an embodiment of the present invention.

Multifunction portable device 150 includes internal audio input device such as microphone 122 and internal audio output device such as speaker 112. In addition, headphones 116 can optionally be connected via headphone jack 115. Wireless headset 114 further includes an audio input device and audio output device that are connected to wireless headset 150 by a short range wireless communications link that uses an infrared link such as IrDA, or a radio frequency communications link conforming to the Bluetooth standard. The user interface of multifunction portable device 150 includes a keypad 118 and a display device, such as touch screen 200, for displaying graphics and text, and for providing an additional touch sensitive interface with soft keys and/or graphics input and or handwriting recognition. Multifunction portable device 150 includes a touch screen driver 275 and/or one or more integrated circuits (ICs) that implement the features and functions in accordance with one or more embodiments of the present invention that are discussed herein FIG. 3-4 present pictorial diagram representations of a personal digital assistant and computer in accordance with an embodiment of the present invention. While the preceding disclosure has been directed to a touch screen driver 275 used in conjunction with handheld audio system 80 and/or multifunction portable device 150, in an embodiment of the present invention, the touch screen driver 275 be implemented by itself or part of other integrated circuits including a system on a chip integrated circuit. While implemented as part of an integrated circuit or as part of a system on a chip integrated circuit, this touch screen driver 275 can be used in a wide variety of electronic devices such as personal digital assistant 84, in computer 86, or in a variety of other electronic devices that include a touch screen.

Figure 5:
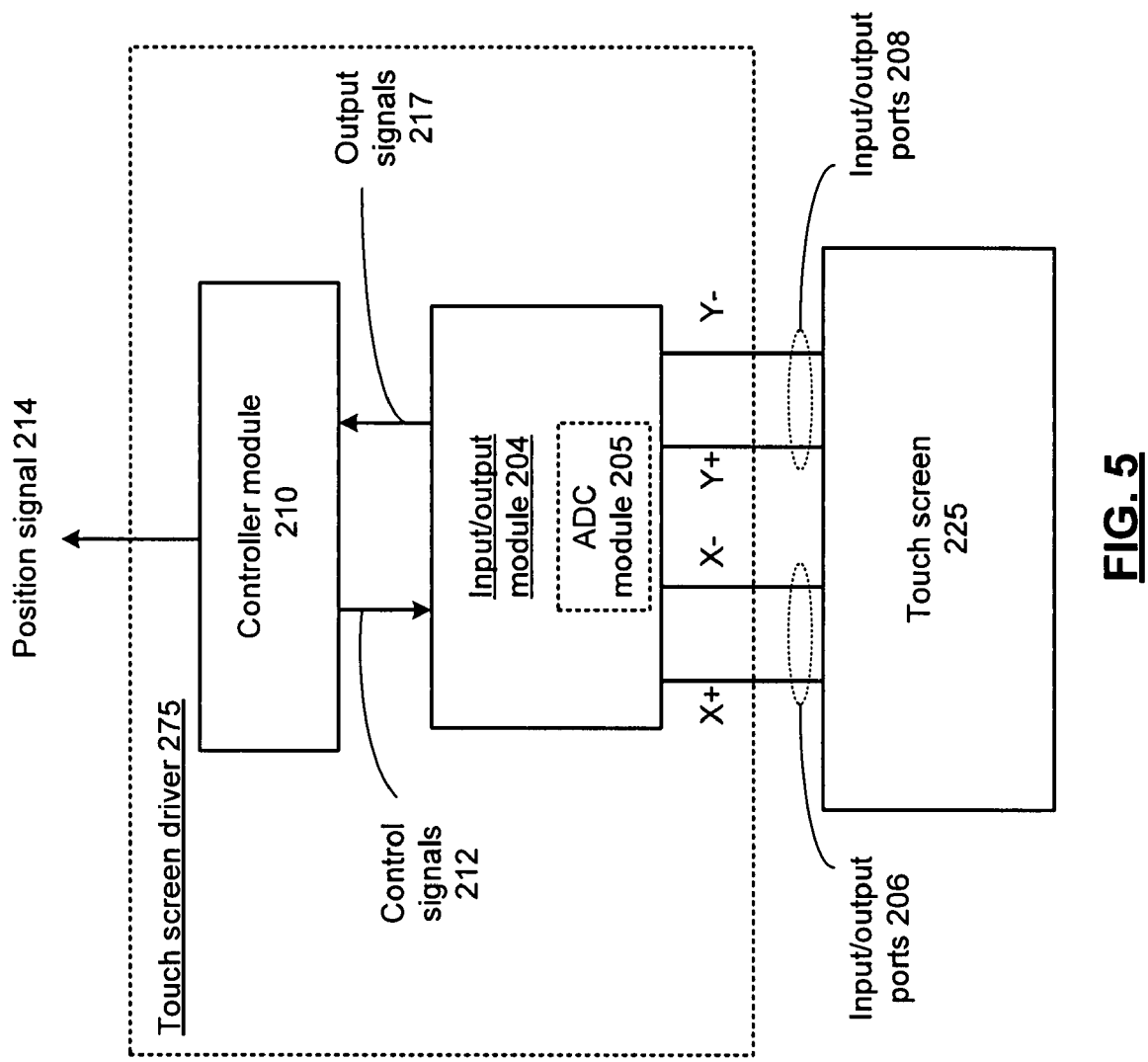
FIG. 5 presents a block diagram representation of a touch screen driver in accordance with an embodiment of the present invention.

FIG. 5 presents a block diagram representation of a touch screen driver in accordance with an embodiment of the present invention. In particular, a touch screen driver 275 includes an input/output module 204 that is coupled to touch screen 225, such as a 4-wire resistive touch screen, that responds to control signals 212 from a controller module 210 and supplies input signals to one or more of the input/output ports 206, 208 and that generates at least one output signal 217 in response to the input signal in accordance with the control signals 212 and in response to touches of the touch screen, such as a plurality of contemporaneous touches. While a 4-wire touch screen 200 is shown other touch screen configurations, such as 5-wire, 7-wire, 8-wire or other configurations can likewise be implemented.

In an embodiment of the present invention, input/output module 204 includes a switch matrix and one or more voltage or current supplies or other signal generators that can selectively apply voltages, currents or other input signals to one or more of the input/output ports X+, X−, Y+, Y−. In operation, input/output module 204 measures one or more electrical properties such as voltages, currents or impedances from the lines X+, X−, Y+, Y− in response to these input signals. Input/output module 204 includes an analog to digital converter (ADC) module 205 that is operable to sample and digitize voltages or currents from input/output ports 206 and 208 and to supply corresponding output signals 217 to controller module 210.

Controller module 210 generates the control signals 212 that command the input/output module 204 to generate selected input signals and further generates a position signal 214, based on output signals 217, representing a resolved position in accordance with a plurality of contemporaneous touches of the resistive touch screen 200. This position signal 214 can be used internally by controller module 210 or processed by a processor of a host device, such as handheld audio system 80, multifunction portable device 150, personal digital assistance 84 or computer 86 in an application that uses the position signal 214 as touch screen input as part of the user interface of the application. In an embodiment of the present invention, touch screen driver 275 generates a position signal 214 that indicates a resolved position that corresponds to a center of the plurality of contemporaneous touches of the resistive touch screen. Further, the position signal 214 can indicate a resolved position that corresponds to a distance between the plurality of contemporaneous touches of the resistive touch screen. In addition, the position signal 214 can directly indicate the positions, such as the x-y coordinates of two or more touches of the touch screen.

In an embodiment of the present invention, controller module 210 can be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. It should be noted that touch screen driver 275 can be implemented in an integrated circuit, either by itself, or in conjunction with other circuit components, such as a system on a chip integrated circuit.

Further features and implementations of the present invention including several alternative embodiments are further described with reference to FIGS. 6-17 that follow.

Figure 6:
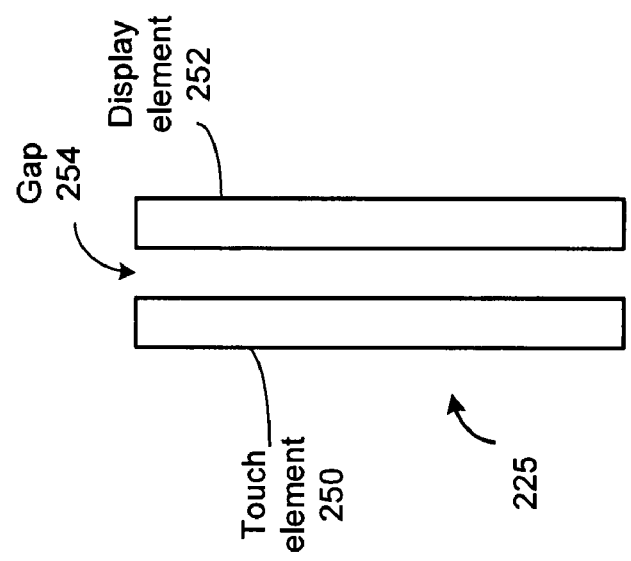
FIG. 6 presents an expanded side view of a touch screen in accordance with an embodiment of the present invention.

FIG. 6 presents an expanded side view of a touch screen in accordance with an embodiment of the present invention. In particular, touch screen 225, such as touch screen 200, is a resistive touch screen that includes a transparent touch element 250 and a display element 252, such as a liquid crystal display, that are separated by a gap 254. In particular, touch element 250 and display element 252 include resistive sheets. When touch element 250 is pressed by the user at a particular an x-y coordinate or region of the touch screen 225, the resistive element of touch element 250 comes into contact with the resistive element of display element 252 and closes a circuit as described in conjunction with FIGS. 7-9 that follows.

Figure 7:
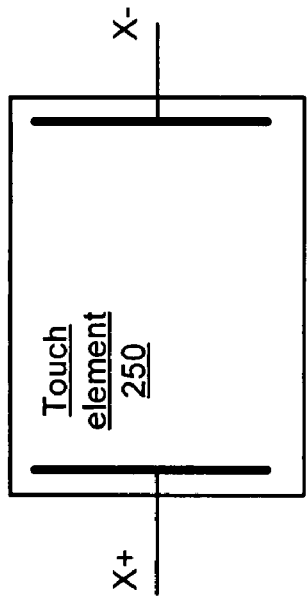
FIG. 7 presents a schematic diagram representation of a touch element in accordance with an embodiment of the present invention.
Figure 8:
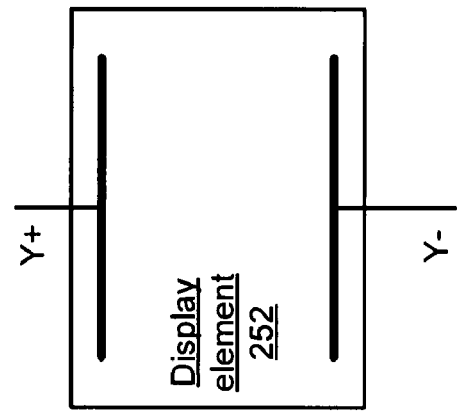
FIG. 8 presents a schematic diagram representation of a display element in accordance with an embodiment of the present invention.

FIGS. 7-8 present schematic diagram representations of a touch element and display element in accordance with an embodiment of the present invention. In particular, the resistive sheets of touch element 250 and display element 252 are coupled by a pair of electrodes to input/output ports X+, X−, Y+ and Y−. The resistive sheets contact one another when the touch screen 225 is touched by a user and form a resistive voltage divider that can be used to ascertain the x-y coordinates or region that was touched.

While FIGS. 7-8 present a configuration whereby the x-axis is included on the touch element 250 and the y-axis is included on the display element 252, other configurations are likewise possible. Further, while a four-wire configuration is shown, other configurations including five wires or more are likewise possible within the broad scope of the present invention.

Figure 9:
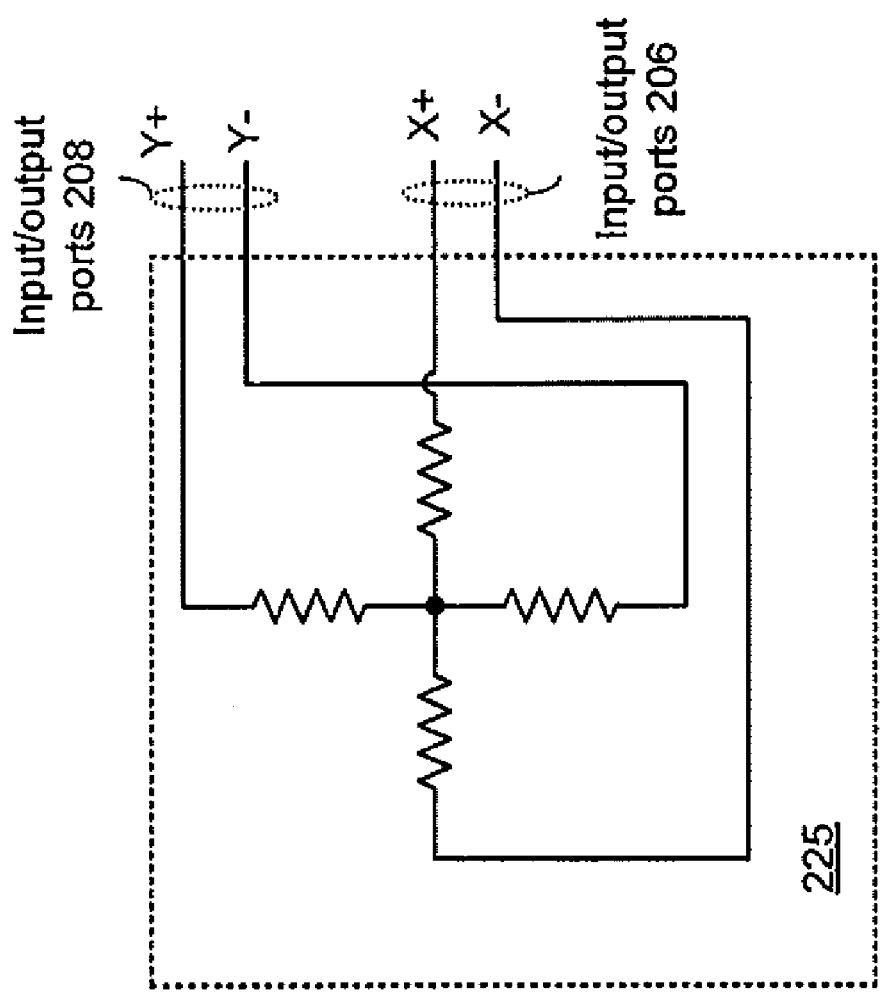
FIG. 9 presents a schematic diagram representation of a touch screen in accordance with an embodiment of the present invention.

FIG. 9 presents a schematic diagram representation of a touch screen in accordance with an embodiment of the present invention. In particular, the circuit equivalent of touch screen 225 is shown in a condition where the screen has been touched at a single point. The particular x-y coordinates or location of the touch can be determined by driving the input/output ports 206 with a input signal containing an input voltage and measuring an output voltage from input/output ports 208, and further by driving the input/output ports 208 with an input signal containing an input voltage and measuring an output voltage from input/output ports 206. In an embodiment of the present invention, the input signals and output signals can be either differential or common mode signals referenced from either the positive or negative terminal of the input/output ports 206 or 208.

In operation, controller module 210, generates control signals 212 that command the input/output module 204 to generate the input signal for driving the port input/output ports 206 and generate the output signal 217 derived from the input/output ports, and at some other time either before or after this operation to generate the input signal for driving the port input/output ports 208 and to generate another output signal 217. In addition, the controller module 210, via algorithm, look-up or other technique processes the output signals 217 generated above to determine the x and y coordinates that correspond to the position of the touch on the touch screen 225. The x coordinate of a single touch can be resolved by driving the voltage potential across the X+ and X− ports and measuring the voltage of either the Y+ or Y− ports. Similarly, the y coordinate of a single touch can be resolved by driving the voltage potential across the Y+ and Y− ports and measuring the voltage of either the X+ or X− ports.

While this works well in circumstances when the touch screen 225 is touched at a single point, alternative techniques need to be employed to resolve multiple contemporaneous touches. Further details regarding the operation of touch screen driver 275 in resolving the position of multiple contemporaneous touches is provided in conjunction FIGS. 10-17 that follow.

Figure 10:
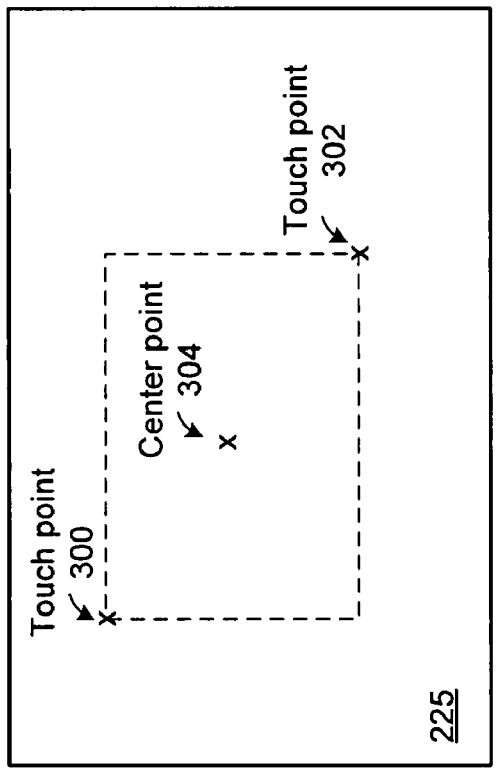
FIG. 10 presents a schematic diagram representation of a touch screen in accordance with an embodiment of the present invention.

FIG. 10 presents a schematic diagram representation of a touch screen in accordance with an embodiment of the present invention. In particular, touch screen 225 is shown for use with touch screen driver 275 that is being touched contemporaneously at touch point 300 and 302. In this embodiment, position signal 214 indicates an X-position and a Y-position that represent x and y coordinates of the center point 304. In this example, center point 304 is a centroid of the touch points 300 and 302 however, other center points could likewise be resolved.

In operation, controller module 210 generates a first control signal 212 that commands the input/output module 204 to drive the input/output ports 206 and to generate a plurality of output signals 217 from Y+ and Y− ports. Further controller module 210 generates a second control signal 212 that commands the input/output module 204 to drive the input/output ports 208 and to generate the second plurality of output signals 217 from the X+ and X− ports. The controller module 210 then generates the X-position based on an average of the first plurality of output signals and generates the Y-position based on an average of the second plurality of output signals.

For example, in response to the control signals from the controller module 210, the input/output module 204 drives a voltage or current on Y+ and grounds Y−. The input/output module 204 reads the voltage at both X+ and X−. The controller module 210 can then determine the Y position of center point 304 based on the average of the X+ voltage and the X− voltage. Similarly, in response to the control signals from the controller module 210, the input/output module 204 drives a voltage or current on X+ and grounds X−. The input/output module 204 reads the voltage at both Y+ and Y−. The controller module 210 can then determine the X position of center point 304 based on the average of the Y+ voltage and the Y− voltage. It should be noted that this is merely an example of how the position of the center point 304 can be resolved. In other embodiments, the input/output module 204 can drive voltages or currents, drive the positive terminal, negative terminal or both terminals, can measure other electrical properties of the positive and negative terminals of other ports, et cetera.

Figure 11:
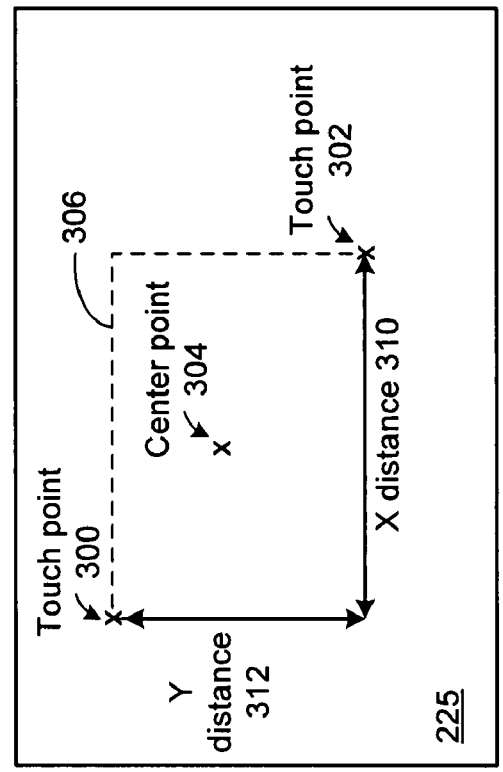
FIG. 11 presents a schematic diagram representation of a touch screen in accordance with an embodiment of the present invention.

FIG. 11 presents a schematic diagram representation of a touch screen in accordance with an embodiment of the present invention. In particular, touch screen 225 is shown for use with touch screen driver 275 that is being touched contemporaneously at touch point 300 and 302. In this embodiment position signal 214 includes an X-distance 310 and a Y-distance 312 that represents the distance between the touch points 300 and 302. In this example, Cartesian distances are used to represent the distance between touch points 300 and 302, however a direct distance between the two touch points or other distance measures can likewise be used in alternative embodiments.

In an embodiment of the present invention, the position signal 214 indicates the X-distance 310 and the Y-distance 312. In operation, controller module 210 generates a first control signal 212 that commands the input/output module 204 to drive the input/output ports 206 and to generate a first output signal 217 from the input/output port 206. Further, controller module 210 generates a second control signal 212 that commands the input/output module 204 to drive the input/output ports 208 and to generate a second output signal 217 from the input/output port 208. Controller module 210 then generates the X-distance 310 based on the first output signal 217 and generates the Y-distance 312 based on the second output signal 217. It should be noted that the measurements for the center point 304 and the X and Y distances 310, 312 can be taken together in one pass. For instance, input/output module 204 can drive the Y+/Y− ports and measure the y-coordinate of the center point 304 and the Y-distance 312, then drive the X+/X− ports and measure the x coordinate of the center point 304 and the X-distance 310.

For example, the first output signal 217 can correspond to an impedance across the input/output ports 206, the second output signal can correspond to an impedance across the input/output ports 208. These impedances can be generated by driving a current and measuring a voltage, driving a voltage and measuring a current, et cetera. The control module 204, in turn generates the X-distance based on a linear or nonlinear function of the first output signal and generates the Y-distance based on a linear or nonlinear function of the second output signal. It should be noted that the X+/X– impedance is a monotonically decreasing function of the X-distance and the Y+/Y– impedance is a monotonically decreasing function of the Y-distance. The X-distance and the Y-distance can be determined based on an algorithm or other calculation, finite element model, piecewise linear module, look-up table or other technique that correlates the measured impedance to the actual distance between possible values of touch points 300 and 302 for both the X and Y dimensions of the touch screen 225. While impedances are used in this example, other electrical properties such as currents and voltages can alternatively be used directly to resolve the distance between the touch points 300 and 302. Further while the technique described above generates the X-distance 310 based on the X+/X– impedance and the Y-distance 312 based on the Y+/Y– impedance, the accuracy of these measurements can be improved by using the both the X+/X– impedance and the Y+/Y– impedance for each of these distances. In particular, the X-distance 310 can be determined as a linear or nonlinear function of the both the X+/X– impedance and the Y+/Y– impedance and the Y-distance 312 can be determined as a linear or nonlinear function of the both the X+/X– impedance and the Y+/Y– impedance.

It should be noted that this technique can be used to reject improper touch, such as touches that are too wide, accidental touches or brushes of the touch screen by objects other than a stylus or other proper pointing device. In particular, the X-distance and or the Y-distance can be compared to a single threshold or differing X and Y thresholds that correspond to an unacceptable width of the touch. When the X-distance or the Y-distance compares unfavorably to their corresponding threshold, such as when either of these distances is too large, the touch can be rejected. Similarly, the X+/X– and Y+/Y– impedances can be used directly for this purpose and compared to corresponding impedance thresholds. When either of these impedances compares unfavorably to their corresponding threshold, such as when either of these impedances is too small, the touch can be rejected.

Figure 12:
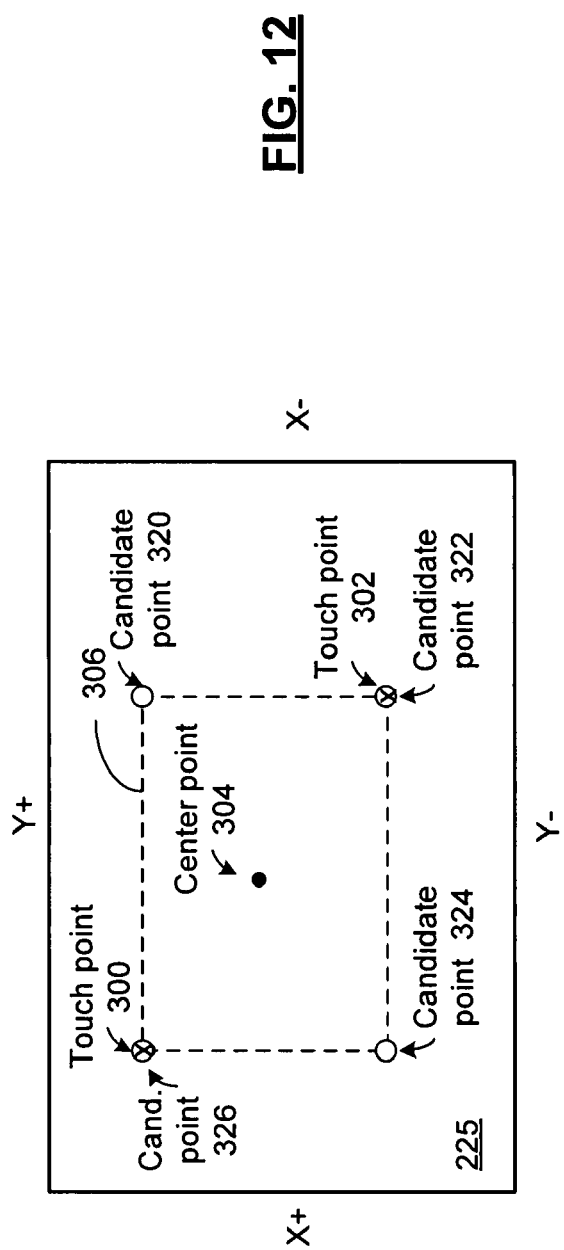
FIG. 12 presents a schematic diagram representation of a touch screen in accordance with an embodiment of the present invention.

FIG. 12 presents a schematic diagram representation of a touch screen in accordance with an embodiment of the present invention. In particular, touch screen 225 is shown for use with touch screen driver 275 that is being touched contemporaneously at touch point 300 and 302. In this embodiment, position signal 214 indicates x and y coordinates of the touch points 300 and 302. While Cartesian coordinates are described, other coordinate systems could likewise be used to indicate the touch positions of the touch points 300 and 302.

In an embodiment of the present invention, the resolved position includes positions corresponding to touch points 300 and 302. In operation, controller module 210 determines a center, such as the coordinates of center 304, as described in conjunction with FIG. 10. The controller module 210 also determines a distance between the touch points 300 and 302, such as the X distance 310 and the Y-distance 312 described in conjunction with FIG. 11. This information narrows down the possible touch points to (300 and 302) or (320 and 324), the opposing vertices of box 306. Controller 210 generates the position of the touch 300, based on the determined center and the distance, and further based on a disambiguation procedure that determines which of the candidate points (the opposing sets of vertices of box 306) include the touch point 300. In a similar fashion, the controller module 210 determines the position of the touch 302 based on the determined center and the distance and further based on the disambiguation procedure.

For example, after determining the center 304 and the distance between vertices of box 306 as discussed in conjunction with FIGS. 10 and 11, controller module 210 generates candidate points 320, 324 and candidate points 322, 326 for the two touch points. The disambiguation procedure can resolve the positions of the touch points 300 and 302 by determining corner impedances of the screen, in this case, looking at impedances such as the impedance between X+/Y–, X–/Y–, Y+/X–, and/or X+/Y+. For instance, with the touch point 302 shown, the impedance X–/Y– impedance will be lower than either the Y–/X+ impedance or the Y+/X– impedance, indicating that the candidate point 322 is the position of touch point 302, not candidate point 320 or 324. Similarly, impedance X+/Y+ will be lower than either the Y–/X+ impedance or the Y+/X– impedance, indicating that the candidate point 326 is the position of touch point 302, not candidate point 320 or 324.

Controller module 210, in one possible disambiguation procedure, commands input/output module 204 to generate a first output signal 217 based on the impedance between one of the input/output ports X+ or X– and one of the Y+ or Y– input/output ports. In addition, controller module 210, commands input/output module 204 to generate a second output signal 217 based on the either: (a) the impedance between the X input/output port (X+ or X–) selected to generate the first output signal and the Y input/output port (Y+ or Y–) not selected to generate the first output signal; or (b) the impedance between the X input/output port (X+ or X–) not selected to generate the first output signal and the Y input/output port (Y+ or Y–) selected to generate the first output signal. These first and second output signals are then compared and the candidate points corresponding to touch points 300 and 302 (in this case candidate points 322 and 326) are determined based on whether the first output signal compares favorably or unfavorably, such as being less than or greater than, the second output signal.

While the disambiguation procedure described above compares output signals corresponding to two corner impedances, likewise, all four corner impedances could be calculated, the results for opposing corners added or averaged and the sum or average of each pair could likewise be compared to the sum or average for the other pair and used in the disambiguation procedure. In the alternative, resolving the position of one of the touch points, resolves the position of the other touch point as the candidate point at the opposing vertex of box 306. These impedances can be measured by driving a current and measuring a voltage, driving a voltage and measuring a current, et cetera. While impedances are used in this example, other electrical properties such as currents and voltages can alternatively be used directly to resolve the distance between the touch points 300 and 302.

Figure 13:
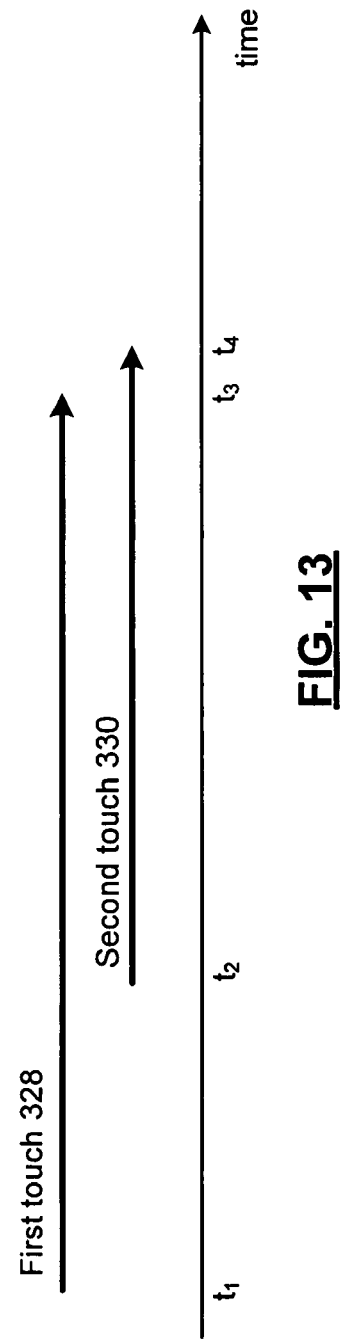
FIG. 13 presents a timing diagram representation that shows the temporal relationship between multiple touches of a touch screen in accordance with an embodiment of the present invention.

FIG. 13 presents a timing diagram representation that shows the temporal relationship between multiple touches of a touch screen in accordance with an embodiment of the present invention. In particular, in some circumstances when two points are touched on a touch screen, such as touch screen 200, one of the points is touched before the other point. The timing diagram of FIG. 13 represents that first touch 328, such as touch point 300, begins at time $t_1$ and ends at time $t_3$ and that second touch 330, such as touch point 302, begins at time $t_2$ and ends at time $t_4$. Touch screen driver 275 can operate in an alternative fashion to resolve the first touch 328 before the beginning of the second touch 330 at time $t_2$. In this mode of operation, the touch screen driver 275 can operate as discussed in conjunction with FIG. 9 to resolve the position of the first touch 328 as a single touch. Then, when the second touch 330 occurs at $t_2$, the center point and distance between touches can be determined for the two touches as described in conjunction with FIGS. 10 and 11. Since the position of the first touch 328 has already been determined, the controller module 210 can determine the position of the second touch 330 without the disambiguation procedure of FIG. 12 as the vertex on box 306 that is opposite the first touch 328.

In an embodiment of the present invention, input/output module 204 supplies a plurality of input signals to at least one of a plurality of input/output ports of the touch screen 200 and generates a plurality of output signals 217 in response to the plurality of input signals, and in accordance with at least one control signal 212. Controller module 210 generates the at least one control signal 212 and generates a first position signal 214 representing a position of the first touch 328 and a second position signal 214 representing a second touch 330. As discussed, the first touch 328 begins before the beginning of the second touch 330, the first touch 328 continues during at least a portion of the second touch 330, and the controller module 210 generates the first position signal 214 based on a first output signal of the plurality of output signals 217 generated before the beginning of the second touch 330. In addition, the controller module 210 generates the second position signal 214 based on a second output signal of the plurality of output signals 217 generated after the beginning of the second touch 330.

While the description above has been focused on the use of this temporal resolution of a plurality of touches for a resistive touch screen, such as touch screen 225, the touch screen driver 275, in accordance with an embodiment of the present invention, the temporal resolution can alternatively be used for disambiguation of multiple sets of possible touch points for a capacitive touch screen 200. In a capacitive touch screen application this temporal resolution can be extended beyond 2 touches to 3 or more touches.

Further, while the present invention has focused on resolving two simultaneous touch points of a touch screen, techniques described herein can be similarly applied to the resolution of three or more touch points of a touch screen 200 or 225.

The foregoing description presents circuit implementations in a four-wire touch screen configuration, the input signals to the x and y axes can be applied simultaneously in alternative touch screen configurations such as an eight-wire configuration that include separate x and y axes on both the touch element 250 and the display element 252.

The following FIGS. 14-17 present methods that can be used in conjunction with one or more functions and features of the present invention as described in conjunction with FIGS. 1-13.

FIG. 14 presents a flowchart representation of a method in accordance with an embodiment of the present invention. In step 400, at least one input signal is generated to at least one of a plurality of input/output ports of the resistive touch screen. In step 402, at least one output signal is generated in response to the at least one input signal. In step 404, a position signal is generated representing a resolved position in accordance with a plurality of contemporaneous touches of the resistive touch screen, based on the at least one output signal.

In an embodiment of the present invention, the resolved position corresponds to a center of the plurality of contemporaneous touches of the resistive touch screen. The position signal can include an X-position and a Y-position, and the plurality of input/output ports can include a plurality of X panel ports and a plurality of Y panel ports. Step 400 can include generating a first input signal to drive at least one of the plurality of X panel ports and step 402 can include generating a first plurality of output signals from the plurality of Y panel ports. Step 400 can further include generating a second input signal to drive at least one of the plurality of Y panel ports and step 402 can further include generating a second plurality of output signals from the plurality of X panel ports. Step 404 can include generating the X-position based on an average of the first plurality of output signals, and generating the Y-position based on an average of the second plurality of output signals.

In an embodiment of the present invention, the resolved position corresponds to a distance between the plurality of contemporaneous touches of the resistive touch screen. The position signal can include an X-distance and a Y-distance, and the plurality of input/output ports can include a plurality of X panel ports and a plurality of Y panel ports. Step 400 can include generating a first input signal to drive at least one of the plurality of X panel ports and step 402 can include generating a first output signal from at least one of the plurality of X panel ports. Step 404 can further include generating a second input signal to drive at least one of the plurality of Y panel ports and step 402 can further include generating a second output signal from at least one of the plurality of Y panel ports. Step 404 can include generating the X-distance based on the first output signal and generating the Y-distance based on the second output signal. Further, step 404 can include generating the X-distance based on the first output signal and the second output signal and generating the Y-distance based on the first output signal and the second output signal.

The first output signal can correspond to an impedance across the plurality of X panel ports, and the second output signal can correspond to an impedance across the plurality of Y panel ports. Generating the X-distance can include generating the X-distance based on a linear or nonlinear function of the first output signal and/or the second output signal and generating the Y-distance can include generating the Y-distance based on a linear or nonlinear function of the first output signal and/or the second output signal.

In an embodiment of the present invention, the resolved position includes a position of a first touch of the plurality of contemporaneous touches and a position of a second touch of the plurality of contemporaneous touches. Step 404 can include generating a center between the first touch and the second touch, generating a distance between the first touch and the second touch, generating the position of the first touch based on the center and the distance and further based on a disambiguation procedure, and determining the position of the second touch based on the center and the distance and further based on the disambiguation procedure.

The plurality of input/output ports can include a plurality of X panel ports and a plurality of Y panel ports and step 402 can include generating a first output signal based on an impedance between a first port of the plurality of X panel ports and a second port of the plurality of Y panel ports. Step 402 can further include at least one of: (a) generating the second output signal based on an impedance between the first port of the plurality of X panel ports and a third port of the plurality of Y panel ports; and (b) generating the second output signal based on an impedance between a third port of the plurality of X panel ports and the second port of the plurality of Y panel ports.

The disambiguation procedure discussed above can include generating a first candidate and a second candidate for the position of the first touch, comparing the first output signal to the second output signal, choosing the first candidate for the position of the first touch when the first output signal compares unfavorably to the second output signal, and choosing the second candidate for the position of the first touch when the first output signal compares favorably to the second output signal. The disambiguation can further include generating a third candidate and a fourth candidate for the position of the second touch, comparing the first output signal to the second output signal, choosing the third candidate for the position of the second touch when the first output signal compares unfavorably to the second output signal, and choosing the fourth candidate for the position of the second touch when the first output signal compares favorably to the second output signal.

In an embodiment of the present invention, the disambiguation procedure includes generating a first output signal based on an impedance between the X+ port and the Y− port, generating a second output signal based on the an impedance between the X− port and the Y+ port, generating a third output signal based on an impedance between the X+ port and the Y+ port, and generating a fourth output signal based on the an impedance between the X− port and the Y− port. A first sum is generated based on a sum of the first output signal and the second output signal and a second sum is generated based on a sum of the third output signal and the fourth output signal. A first candidate and a second candidate are generated for the position of the first touch. The first sum is compared to the second sum. The first candidate is chosen for the position of the first touch when the first sum compares unfavorably to the second sum. The second candidate is chosen for the position of the first touch when the first sum compares favorably to the second sum.

Figure 15:
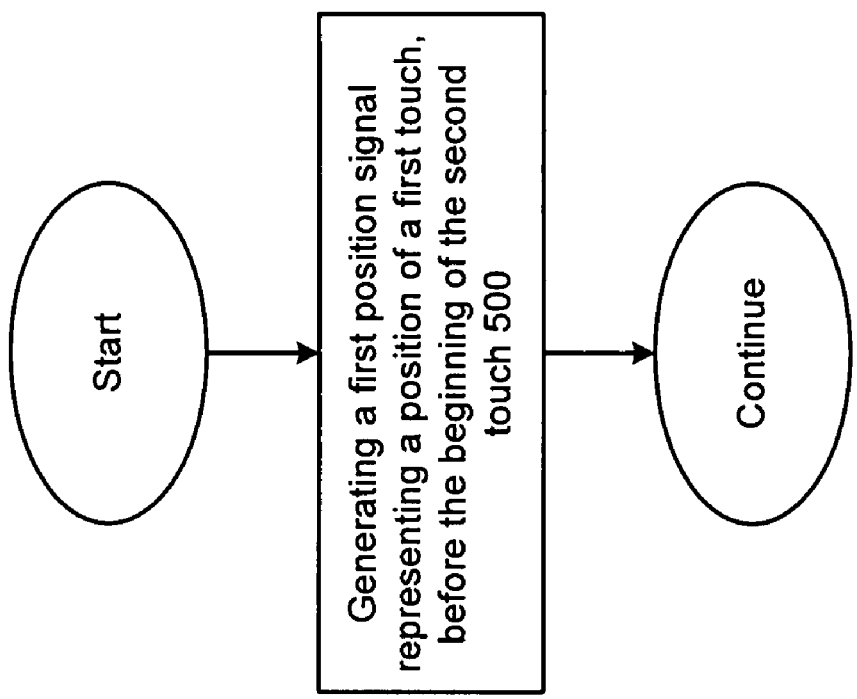
FIG. 15 presents a flowchart representation of a method in accordance with an embodiment of the present invention.

FIG. 15 presents a flowchart representation of a method in accordance with an embodiment of the present invention. In particular a method is presented for use with a touch screen that can be a resistive touch screen, a capacitive touch screen or other touch screen for resolving the position of a first touch of the touch screen and a second touch of the touch screen, wherein the first touch begins before a second touch of the touch screen, wherein the first touch continues during at least a portion of the second touch. In step 500, a first position signal is generated representing a position of a first touch of the touch screen, before the beginning of the second touch.

Figure 16:
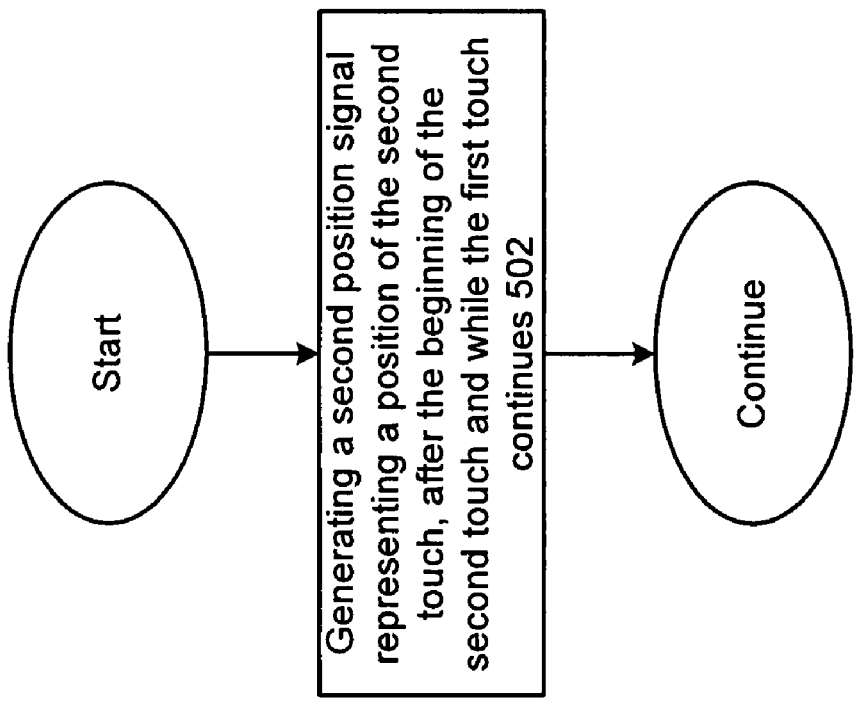
FIG. 16 presents a flowchart representation of a method in accordance with an embodiment of the present invention.

FIG. 16 presents a flowchart representation of a method in accordance with an embodiment of the present invention. In particular, an optional step is presented for use in conjunction with the method of FIG. 15. In step 502, a second position signal is generated representing a position of the second touch, after the beginning of the second touch and while the first touch continues.

Figure 17:
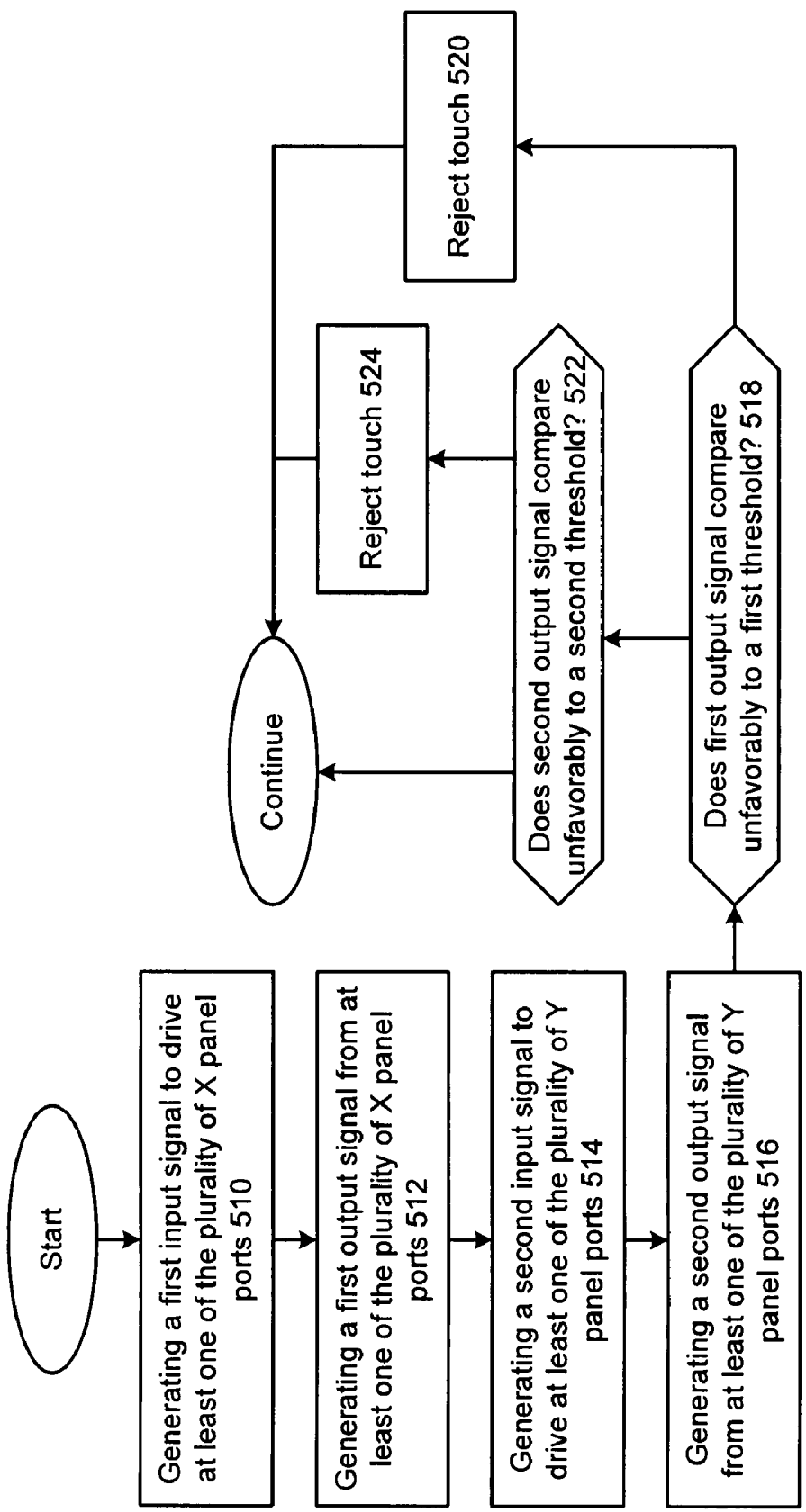
FIG. 17 presents a flowchart representation of a method in accordance with an embodiment of the present invention.

FIG. 17 presents a flowchart representation of a method in accordance with an embodiment of the present invention. In particular, a method is presented for use with a touch screen for rejecting a touch of the touch screen that includes a plurality of X panel ports and a plurality of Y panel ports. In step 510, a first input signal is generated to drive at least one of the plurality of X panel ports. In step 512, a first output signal is generated from the at least one of the plurality of X panel ports. In step 514, a second input signal is generated to drive at least one of the plurality of Y panel ports. In step 516, a second output signal is generated from the at least one of the plurality of Y panel ports. In step 518, the first output signal is compared to a first threshold. The touch is rejected when the first signal compares unfavorably to the first threshold, as shown in step 520. In step 522, the second output signal is compared to a second threshold. In step 524, the touch is rejected when the second signal compares unfavorably to second first threshold.

In circuit embodiments of the present invention, various circuit components are implemented using 0.50 micron or smaller CMOS technology. Provided however that other circuit technologies, both integrated or non-integrated, may be used within the broad scope of the present invention.

Various elements and modules embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a touch screen driver. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A touch screen driver for use with a resistive touch screen, the touch screen driver comprising:

an input/output module, coupled to the resistive touch screen, that supplies at least one input signal to at least one of a plurality of input/output ports of the resistive touch screen and that generates at least one output signal, in response to the at least one input signal, and in accordance with at least one control signal;

a controller module, coupled to the input/output module, that generates the at least one control signal and that generates a position signal representing a resolved position in accordance with a plurality of contemporaneous touches of the resistive touch screen; and wherein the resolved position includes a position of a first touch of the plurality of contemporaneous touches and a position of a second touch of the plurality of contemporaneous touches, and wherein the controller module generates the resolved position by:

generating a center between the first touch and the second touch;

generating a distance between the first touch and the second touch;

generating the position of the first touch based on the center and the distance and further based on a disambiguation procedure; and determining the position of the second touch based on the center and the distance and further based on the disambiguation procedure.

2. The touch screen driver of claim 1 wherein the position signal includes an X-position and a Y-position, the plurality of input/output ports includes a plurality of X panel ports and a plurality of Y panel ports, the at least one control signal includes a first control signal and a second control signal, the at least one output signal includes a first plurality of output signals and a second plurality of output signals, and wherein the controller module generates the position signal by:

generating the first control signal that commands the input/output module to drive at least one of the plurality of X panel ports and to generate the first plurality of output signals from the plurality of Y panel ports;

generating the second control signal that commands the input/output module to drive at least one of the plurality of Y panel ports and to generate the second plurality of output signals from the plurality of X panel ports;

generating the X-position based on an average of the first plurality of output signals; and generating the Y-position based on an average of the second plurality of output signals.

3. The touch screen driver of claim 1 wherein the position signal includes an X-distance and a Y-distance, the plurality of input/output ports includes a plurality of X panel ports and a plurality of Y panel ports, the at least one control signal includes a first control signal and a second control signal, the at least one output signal includes a first output signal and a second output signal, and wherein the controller module generates the position signal by:

generating the first control signal that commands the input/output module to drive at least one of the plurality of X panel ports and to generate the first output signal from at least one of the plurality of X panel ports;

generating the second control signal that commands the input/output module to drive at least one of the plurality of Y panel ports and to generate the second output signal from at least one of the plurality of Y panel ports;

generating the X-distance based on the first output signal; and generating the Y-distance based on the second output signal.

4. The touch screen driver of claim 3 wherein the first output signal corresponds to an impedance across the plurality of X panel ports, the second output signal corresponds to an impedance across the plurality of Y panel ports, wherein the control module generates the X-distance based on a function of the first output signal and the second output signal, and wherein the control module generates the Y-distance based on a function of the first output signal and the second output signal.

5. The touch screen driver of claim 1 wherein the plurality of input/output ports includes a plurality of X panel ports and a plurality of Y panel ports, the at least one control signal includes a first control signal and a second control signal, the at least one output signal includes a first output signal and a second output signal, and wherein the disambiguation procedure performed by the controller module includes:

generating the first output signal based on an impedance between a first port of the plurality of X panel ports and a second port of the plurality of Y panel ports;

and further includes at least one of: generating the second output signal based on an impedance between the first port of the plurality of X panel ports and a third port of the plurality of Y panel ports; and generating the second output signal based on an impedance between the third port of the plurality of X panel ports and the second port of the plurality of Y panel ports.

6. The touch screen driver of claim 5 wherein the disambiguation procedure performed by the controller module further includes:

generating a first candidate and a second candidate for the position of the first touch;

comparing the first output signal to the second output signal;

choosing the first candidate for the position of the first touch when the first output signal compares unfavorably to the second output signal; and choosing the second candidate for the position of the first touch when the first output signal compares favorably to the second output signal.

7. The touch screen driver of claim 1 wherein the plurality of input/output ports includes a X+ port a X− port a Y+ port and a Y− port, the at least one output signal includes a first output signal, a second output signal, a third output signal and a fourth output signal, and wherein the disambiguation procedure performed by the controller module includes:

generating a first output signal based on an impedance between the X+ port and the Y− port;

generating a second output signal based on the an impedance between the X− port and the Y+ port;

generating a third output signal based on an impedance between the X+ port and the Y+ port;

generating a fourth output signal based on the an impedance between the X− port and the Y− port;

generating a first sum based on a sum of the first output signal and the second output signal;

generating a second sum based on a sum of the third output signal and the fourth output signal;

generating a first candidate and a second candidate for the position of the first touch;

comparing the first sum to the second sum;

choosing the first candidate for the position of the first touch when the first sum compares unfavorably to the second sum; and choosing the second candidate for the position of the first touch when the first sum compares favorably to the second sum.

8. A touch screen driver for use with a touch screen, the touch screen driver comprising:
- an input/output module, coupled to the touch screen, that supplies a plurality of input signals to at least one of a plurality of input/output ports of the touch screen and generates a plurality of output signals, in response to the plurality of input signals, and in accordance with at least one control signal; and
- a controller module, coupled to the input/output module, that generates the at least one control signal and that generates a first position signal representing a position of a first touch of the touch screen and a second position signal representing a second touch of the touch screen, wherein the first touch begins before the beginning of the second touch, wherein the first touch continues during at least a portion of the second touch, and wherein the controller module generates the first position signal based on a first output signal of the plurality of output signals generated before the beginning of the second touch, wherein the controller module generates the first position signal and the second signal based upon a center between the first touch and the second touch, a distance between the first touch and the second touch, and a disambiguation procedure.

9. A touch screen driver of claim 8 wherein the controller module generates the second position signal based on a second output signal of the plurality of output signals generated after the beginning of the second touch.

10. A method for use with a resistive touch screen, the method comprising:
- generating at least one input signal to at least one of a plurality of input/output ports of the resistive touch screen;
- generating at least one output signal, in response to the at least one input signal; and
- generating a position signal representing a resolved position in accordance with a plurality of contemporaneous touches of the resistive touch screen, based on the at least one output signal, wherein generating the position signal includes:
  - generating a center between a first touch and a second touch;
  - generating a distance between the first touch and the second touch;
  - generating the position of the first touch based on the center and the distance and further based on a disambiguation procedure; and
  - determining the position of the second touch based on the center and the distance and further based on the disambiguation procedure.

11. The method of claim 10 wherein the position signal includes an X-position and a V-position, the plurality of input/output ports includes a plurality of X panel ports and a plurality of Y panel ports;
- wherein generating the at least one input signal includes generating a first input signal to drive at least one of the plurality of X panel ports and generating at least one output signal includes generating a first plurality of output signals from the plurality of Y panel ports;
- wherein generating the at least one input signal further includes generating a second input signal to drive at least one of the plurality of Y panel ports and generating at least one output signal further includes generating a second plurality of output signals from the plurality of X panel ports; and
- wherein generating the position signal includes:
  - generating the X-position based on an average of the first plurality of output signals; and
  - generating the Y-position based on an average of the second plurality of output signals 12. The method of claim 10 wherein the position signal includes an X-distance and a Y-distance, the plurality of input/output ports includes a plurality of X panel ports and a plurality of Y panel ports;
- wherein generating the at least one input signal includes generating a first input signal to drive at least one of the plurality of X panel ports and generating the at least one output signal includes generating a first output signal from at least one of the plurality of X panel ports;
- wherein generating the at least one input signal further includes generating a second input signal to drive at least one of the plurality of Y panel ports and generating the at least one output signal includes generating a second output signal from at least one of the plurality of Y panel ports; and
- wherein generating the position signal includes:
  - generating the X-distance based on the first output signal; and
  - generating the Y-distance based on the second output signal.

13. The method of claim 12 wherein the first output signal corresponds to an impedance across the plurality of X panel ports, the second output signal corresponds to an impedance across the plurality of Y panel ports, wherein generating the X-distance includes generating the X-distance based on a function of the first output signal and the second output signal, and wherein the control module generates the Y-distance based on a function of the first output signal and the second output signal.

14. The method of claim 10 wherein the plurality of input/output ports includes a plurality of X panel ports and a plurality of Y panel ports;
- wherein generating the at least, one output signal includes generating a first output signal based on an impedance between a first port of the plurality of X panel ports and a second port of the plurality of Y panel ports;
- wherein generating the at least one output signal further includes at least one of:
  - generating the second output signal based on an impedance between the first port of the plurality of X panel ports and a third port of the plurality of Y panel ports; and
  - generating the second output signal based on an impedance between a third port of the plurality of X panel ports and the second port of the plurality of Y panel ports.

15. The method of claim 14 wherein the disambiguation procedure includes:
- generating a first candidate and a second candidate for the position of the first touch;
- comparing the first output signal to the second output signal;
- choosing the first candidate for the position of the first touch when the first output signal compares unfavorably to the second output signal; and
- choosing the second candidate for the position of the first touch when the first output signal compares favorably to the second output signal.

16. The method of claim 10 wherein the plurality of input/output ports includes a X+ port a X− port a Y+ port and a Y− port, the at least one output signal includes a first output signal, a second output signal, a third output signal and a fourth output signal, and wherein the disambiguation procedure includes:

generating the first output signal based on an impedance between the X+ port and the Y− port;

generating the second output signal based on the an impedance between the X− port and the Y + port;

generating the third output signal based on an impedance between the X+ port and the Y+ port;

generating the fourth output signal based on the an impedance between the X− port and the Y− port;

generating a first sum based on a sum of the first output signal and the second 5 output signal;

generating a second sum based on a sum of the third output signal and the fourth output signal;

generating a first candidate and a second candidate for the position of the first touch;

comparing the first sum to the second sum;

choosing the first candidate for the position of the first touch when the first sum compares unfavorably to the second sum; and choosing the second candidate for the position of the first touch when the first sum compares favorably to the second sum.

\* \* \* \* \*

UNITED STATES PATENT AND TRADEMARK OFFICE
CERTIFICATE OF CORRECTION

| | |
|---|---|
| PATENT NO. | : 8,106,892 B2 |
| APPLICATION NO. | : 11/927289 |
| DATED | : January 31, 2012 |
| INVENTOR(S) | : Matthew D. Felder et al. |

It is certified that error appears in the above-identified patent and that said Letters Patent is hereby corrected as shown below:

At column 16, Line 39, please change "wherein generating the at least, one" to --wherein generating the at least one--

Signed and Sealed this
Seventeenth Day of July, 2012

David J. Kappos
*Director of the United States Patent and Trademark Office*